(12) United States Patent
de Boer et al.

(10) Patent No.: US 10,536,461 B2
(45) Date of Patent: Jan. 14, 2020

(54) SERVICE IDENTITY PROPAGATION BETWEEN APPLICATIONS AND REUSABLE SERVICES

(71) Applicant: SAP SE, Walldorf (DE)

(72) Inventors: Martijn de Boer, Heidelberg (DE); Peter Eberlein, Malsch (DE); Florian Tack, Walldorf (DE); Heiko Ettelbrueck, Nussloch (DE)

(73) Assignee: SAP SE, Walldorf (DE)

( * ) Notice: Subject to any disclaimer, the term of this patent is extended or adjusted under 35 U.S.C. 154(b) by 274 days.

(21) Appl. No.: 15/847,627

(22) Filed: Dec. 19, 2017

(65) Prior Publication Data

US 2019/0190912 A1    Jun. 20, 2019

(51) Int. Cl.
| | | |
|---|---|---|
| H04L 29/06 | (2006.01) | |
| G06F 21/41 | (2013.01) | |
| G06F 21/33 | (2013.01) | |

(52) U.S. Cl.
CPC ............ *H04L 63/10* (2013.01); *G06F 21/335* (2013.01); *G06F 21/41* (2013.01); *H04L 63/08* (2013.01); *H04L 63/0815* (2013.01)

(58) Field of Classification Search
None
See application file for complete search history.

(56) References Cited

U.S. PATENT DOCUMENTS

| | | | |
|---|---|---|---|
| 7,523,142 B2 | 4/2009 | Driesen et al. | |
| 7,657,575 B2 | 2/2010 | Eberlein et al. | |
| 7,720,992 B2 | 5/2010 | Brendle et al. | |
| 7,734,648 B2 | 6/2010 | Eberlein | |
| 7,739,387 B2 | 6/2010 | Eberlein et al. | |
| 7,894,602 B2 | 2/2011 | Mueller et al. | |
| 7,962,920 B2 | 6/2011 | Gabriel et al. | |
| 7,971,209 B2 | 6/2011 | Eberlein et al. | |
| 8,126,919 B2 | 2/2012 | Eberlein | |
| 8,200,634 B2 | 6/2012 | Driesen et al. | |
| 8,225,303 B2 | 7/2012 | Wagner et al. | |
| 8,250,135 B2 | 8/2012 | Driesen et al. | |
| 8,291,038 B2 | 10/2012 | Driesen | |
| 8,301,610 B2 | 10/2012 | Driesen et al. | |
| 8,302,160 B2 | 10/2012 | Hofmann et al. | |
| 8,316,422 B2 | 11/2012 | Hofmann et al. | |
| 8,321,678 B2 | 11/2012 | Hofmann et al. | |
| 8,356,010 B2 | 1/2013 | Driesen | |
| 8,375,130 B2 | 2/2013 | Eberlein et al. | |
| 8,380,667 B2 | 2/2013 | Driesen | |

(Continued)

OTHER PUBLICATIONS

U.S. Appl. No. 14/960,983, filed Dec. 7, 2015, Eberlein, et al.

(Continued)

*Primary Examiner* — Shin-Hon (Eric) Chen
(74) *Attorney, Agent, or Firm* — Fish & Richardson P..C (57) ABSTRACT

A request from a User for a Service is received by an Application. An Open Authorization (OAUTH) Client of the Service is requested from a Service Instance of the Service. A copy OAUTH Client of the Service specific to the User is provided based on a clone OAUTH Client associated with the Service Instance. A Token is obtained to access the Service by providing the copy OAUTH Client to a User Account and Authorization (UAA) entity. Access to the Service is obtained by providing the Token.

17 Claims, 7 Drawing Sheets

(56) References Cited

U.S. PATENT DOCUMENTS

| | | |
|---|---|---|
| 8,392,573 B2 | 3/2013 | Lehr et al. |
| 8,402,086 B2 | 3/2013 | Driesen et al. |
| 8,407,297 B2 | 3/2013 | Schmidt-Karaca et al. |
| 8,434,060 B2 | 4/2013 | Driesen et al. |
| 8,467,817 B2 | 6/2013 | Said et al. |
| 8,473,942 B2 | 6/2013 | Heidel et al. |
| 8,479,187 B2 | 7/2013 | Driesen et al. |
| 8,543,994 B2 | 9/2013 | de Boer et al. |
| 8,555,249 B2 | 10/2013 | Demant et al. |
| 8,560,876 B2 | 10/2013 | Driesen et al. |
| 8,566,784 B2 | 10/2013 | Driesen et al. |
| 8,572,369 B2 | 10/2013 | Schmidt-Karaca et al. |
| 8,604,973 B2 | 12/2013 | Schmidt-Karaca et al. |
| 8,612,406 B1 | 12/2013 | Said et al. |
| 8,645,483 B2 | 2/2014 | Odenheimer et al. |
| 8,706,772 B2 | 4/2014 | Hartig et al. |
| 8,751,573 B2 | 6/2014 | Said et al. |
| 8,762,731 B2 | 6/2014 | Engler et al. |
| 8,762,929 B2 | 6/2014 | Driesen |
| 8,769,704 B2 | 7/2014 | Peddada et al. |
| 8,793,230 B2 | 7/2014 | Engelko et al. |
| 8,805,986 B2 | 8/2014 | Driesen et al. |
| 8,812,554 B1 | 8/2014 | Boulanov |
| 8,868,582 B2 | 10/2014 | Fitzer et al. |
| 8,875,122 B2 | 10/2014 | Driesen et al. |
| 8,880,486 B2 | 11/2014 | Driesen et al. |
| 8,924,384 B2 | 12/2014 | Driesen et al. |
| 8,924,565 B2 | 12/2014 | Lehr et al. |
| 8,930,413 B2 | 1/2015 | Tang et al. |
| 8,972,934 B2 | 3/2015 | Driesen et al. |
| 8,996,466 B2 | 3/2015 | Driesen |
| 9,003,356 B2 | 4/2015 | Driesen et al. |
| 9,009,105 B2 | 4/2015 | Hartig et al. |
| 9,026,502 B2 | 5/2015 | Driesen et al. |
| 9,026,857 B2 | 5/2015 | Becker et al. |
| 9,031,910 B2 | 5/2015 | Driesen |
| 9,032,406 B2 | 5/2015 | Eberlein |
| 9,069,832 B2 | 6/2015 | Becker et al. |
| 9,069,984 B2 | 6/2015 | Said et al. |
| 9,077,717 B2 | 7/2015 | Said et al. |
| 9,122,669 B2 | 9/2015 | Demant et al. |
| 9,137,130 B2 | 9/2015 | Driesen et al. |
| 9,182,979 B2 | 11/2015 | Odenheimer et al. |
| 9,183,540 B2 | 11/2015 | Eberlein et al. |
| 9,189,226 B2 | 11/2015 | Driesen et al. |
| 9,223,985 B2 | 12/2015 | Eberlein et al. |
| 9,229,707 B2 | 1/2016 | Borissov et al. |
| 9,251,183 B2 | 2/2016 | Mandelstein et al. |
| 9,256,840 B2 | 2/2016 | Said et al. |
| 9,262,763 B2 | 2/2016 | Peter et al. |
| 9,274,757 B2 | 3/2016 | Said et al. |
| 9,275,120 B2 | 6/2016 | Mayer et al. |
| 9,724,757 B2 | 8/2017 | Barrett |
| 9,965,613 B2 * | 5/2018 | Lee .................... G06F 21/41 |
| 2008/0120129 A1 | 5/2008 | Seubert et al. |
| 2010/0153341 A1 | 6/2010 | Driesen et al. |
| 2010/0161648 A1 | 6/2010 | Eberlein et al. |
| 2012/0227089 A1 * | 9/2012 | Lee .................... H04L 9/3213 726/4 |
| 2013/0132349 A1 | 5/2013 | Hahn et al. |
| 2013/0325672 A1 | 12/2013 | Odenheimer et al. |
| 2013/0332424 A1 | 12/2013 | Nos et al. |
| 2014/0040294 A1 | 2/2014 | An et al. |
| 2014/0047319 A1 | 2/2014 | Eberlein |
| 2014/0101099 A1 | 4/2014 | Driesen et al. |
| 2014/0108440 A1 | 4/2014 | Nos |
| 2014/0164963 A1 | 6/2014 | Klemenz et al. |
| 2014/0325069 A1 | 10/2014 | Odenheimer et al. |
| 2014/0359594 A1 | 12/2014 | Erbe et al. |
| 2014/0379677 A1 | 12/2014 | Driesen et al. |
| 2015/0006608 A1 | 1/2015 | Eberlein et al. |
| 2015/0100546 A1 | 4/2015 | Eberlein et al. |
| 2015/0178332 A1 | 6/2015 | Said et al. |
| 2016/0028737 A1 * | 1/2016 | Srinivasan .......... H04L 63/0807 726/1 |
| 2017/0025441 A1 | 1/2017 | Mori |
| 2019/0007421 A1 * | 1/2019 | D ................... H04L 63/108 |

OTHER PUBLICATIONS

U.S. Appl. No. 15/083,918, filed Mar. 29, 2016, Eberlein, et al.
U.S. Appl. No. 15/087,677, filed Mar. 31, 2016, Eberlein, et al.
U.S. Appl. No. 15/356,190, filed Nov. 18, 2016, Eberlein, Peter.
U.S. Appl. No. 15/581,459, filed Apr. 28, 2017, Eberlein, et al.
U.S. Appl. No. 15/593,830, filed May 12, 2017, Eberlein, et al.

* cited by examiner

SERVICE IDENTITY PROPAGATION BETWEEN APPLICATIONS AND REUSABLE SERVICES

BACKGROUND

Most reusable services (or "Services") available in networked computing (for example, a multi-tenant (or "Tenant") cloud-computing environment) are consumed through use of basic authentication and a technical user (that is, without context of a business user or a Tenant). Service brokers are used create respective technical usernames and passwords which are provided to consuming software applications (or "Applications"). This is appropriate for many Services that operate without a business user or a Tenant context. Multi-Tenant enabled Applications can still create multiple instances of such Services to separate Tenants, but business Services may desire to natively offer multi-tenancy support, such that an Application only requires one static binding to each Service for all served Tenants. In this scenario, technical user authentication is not sufficient, but other types of authentication (for example, Open Authentication (OAUTH) authentication used with JavaScript Object Notation (JSON) Web Tokens (JWTs)) can be used to provide a desired authentication scheme.

SUMMARY

The present disclosure describes secure identity propagation between software applications (or "Applications") and reusable services (or "Services").

In an implementation, a request from a User for a Service is received by an Application. An Open Authorization (OAUTH) Client of the Service is requested from a Service Instance of the Service. A copy OAUTH Client of the Service specific to the User is provided based on a clone OAUTH Client associated with the Service Instance. A Token is obtained to access the Service by providing the copy OAUTH Client to a User Account and Authorization (UAA) entity. Access to the Service is obtained by providing the Token.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, system security is improved because an issued token (or "Token") (for example, an Open Authentication (OAUTH) authentication used with JavaScript Object Notation (JSON) Web Token (JWT)) is specifically associated to a requested Service. Accordingly, a scope of the issued Token is limited and not usable with other all Services that may be in use by the user. Therefore, a third-party Service cannot maliciously leverage user information associated with the issued Token to access other Services. The third party would be limited to Service access corresponding to user information associated with the issued Token. Second, because a size of the issued Token is smaller in comparison to conventional Tokens. Accordingly, an amount of data storage space and network bandwidth used can be reduced. The described issued Token does not need to carry information for all Services that a particular user has access to. Third, the issued Token covers scopes and concerns of relevant Services. Accordingly, there is less concern on a need to acknowledge or separate scopes of different Services within a Token, or both. Fourth, there is less need for diligent management of a Token lifecycle, improving overall computer processing speed and preserving other computer resources (for example, memory storage, network bandwidth, data throughput, and graphical user interface display speed. Fifth, for a new Application integrating with a Service, a new Service instance can be created, therefore eliminating a need for enhancing a particular Token.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DETAILED DESCRIPTION

The following detailed description describes secure identity propagation between software applications (or "Applications") and reusable services (or "Services"), and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and Applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Most Services available in a networked computing environment (for example, a multi-tenant (or "Tenant") cloud-computing environment) are consumed through use of basic authentication and a technical user (that is, without context of a business user or a Tenant). Service brokers are used create respective technical usernames and passwords which are provided to consuming Applications. This is appropriate for many Services that operate without a business user or a Tenant context. Multi-Tenant enabled Applications can still create multiple instances of such Services to separate Tenants, but some Services may desire to natively offer multi-tenancy support, such that an Application only requires one static binding to each Service for all served Tenants. In this scenario, technical user authentication is not sufficient, but other types of authentication (for example, Open Authentication (OAUTH) authentication used with JavaScript Object Notation (JSON) Web Tokens (JWTs)) can be used to provide a desired authentication scheme.

Conventional authentication of a component (such as, an Application or a Service), requires that an Application forward a token (or "Token") (for example, an Application JWT Token) issued during user authentication. However, this approach poses several concerns, including, but not limited to, security, Token size, separation of concerns, and Token lifecycle management.

With respect to the security concern, in typical implementations, conventional Tokens contain all scopes assigned to a user, so that a particular Token is sufficient for use in authentication with all potentially relevant components receiving requests with the Token from the user. In some instances, a malicious Service could be configured to use the Token to perform a wide range of undesired actions, limited only by the components accessible to the user by assigned scopes.

With respect to Token size, an initial requester (for example, an Application router), needs to request a Token with all scopes used by a particular Application and all consumed Services. This request can cause creation of an unnecessarily-large Token that requires a large amount of data storage space and network bandwidth for transmission of the Token (that is, causing network congestion).

With respect to the separation of concerns, different Services may have different concerns, which may need to be separated. However, in conventional implementations, a caller Application requires knowledge all of applicable scopes. As previously described, this practice can require an unnecessary amount of storage space, and can congest a communication network.

With respect to Token lifecycle management, in conventional practice for each new Application integrating with a Service, a new deployment of the Service is required. This practice consumes system or personnel resources, or both, to perform the required configuration and deployment of the Service.

At a high-level, to simplify consumption of multi-Tenant enabled Services and to overcome or at least mitigate the described concerns and other concerns consistent with this disclosure and as will be apparent to those of ordinary skill in the art, a new communication approach is necessary. With respect to OAUTH authentication, with the described approach, an Application is configured to call a Service on behalf of a particular user. The called Service is also configured to work on behalf of the user. That is, the Service receives information about the user (for example, identity, Tenant. and scopes (as far as relevant for the Service)) from an authentication operation in a dedicated JWT Token. The JWT Token is provided by the Application when calling the Service.

At a lower-level, the disclosure describes the use of Service OAUTH clients issued for requesting Applications and users and a Master OAUTH Client associated with each Service. A clone of the Master OAUTH Client is issued for each Application, and a copy of the issued clone is used for each user requesting the Service with the Application. The Application can receive access Tokens (for example, JWT Tokens) to a Service by providing the copy of the issued clone to the Service. The Application receives an access Token from an authentication entity, for example a Use Account and Authentication (UAA) entity. The access Token may be specific to the Application and the user.

Figure 1:
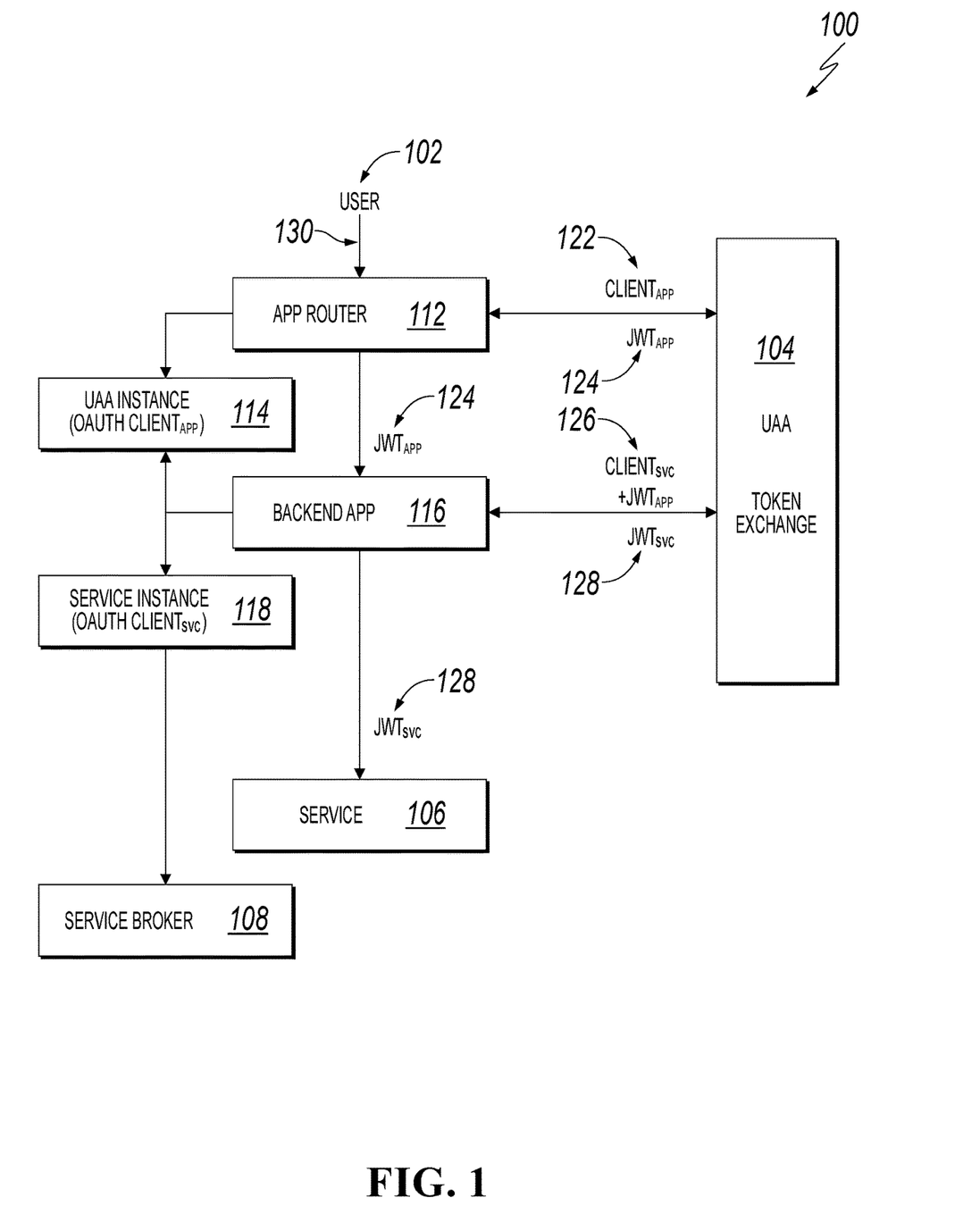
FIG. 1 is a block diagram illustrating high-level component/data relationships in a computing system for secure identity propagation between software applications (or "Applications") and services (or "Services"), according to an implementation of the present disclosure.

Turning to FIG. 1, FIG. 1 is a block diagram illustrating high-level component/data relationships in a computing system 100 for secure identity propagation between Applications and Services, according to an implementation of the present disclosure. System 100 includes a User 102, a User Account and Authentication (UAA) entity (UAA 104), a Service (Service 106), a Service broker (Service Broker 108), an application router (App Router 112), a UAA instance (UAA Instance 114), a backend application (Backend App 116), and a Service instance (Service Instance 118) connected over a network 130. Although only one connection is FIG. 1 is labeled as network 130, in some implementations, all components of system 100 (and, similarly, FIGS. 2-4) can be connected by network 130 or a combination of individual networks acting together as network 130. In some implementations, one or more of the illustrated components of system 100 can be implemented in multi-Tenant cloud-computing environment (for example, CLOUD FOUNDRY). In some implementations, the illustrated components can be integrated on one or more computing devices.

In system 100, User 102 can work with a backend application 116 (for example, using a User Application (not illustrated) executing on a client computing device, such as a smartphone, tablet computer or laptop computer). The User Application sends a request that is first received at App Router 112 which performs user authentication and issues an Application Access Token $JWT_{App}$ 124 for the App Router OAuth $Client_{App}$ that it received from its UAA Instance 114. The App Router 112 forwards the request of User 102 along with the Application Access Token ($JWT_{App}$ 124) to Backend App 116. As the Backend App 116 shares the same UAA Instance 114 (and with it the OAuth $Client_{App}$) with the App Router 112, this token is accepted by the Backend App 116. To process the User Request, the Backend App 116 sends a request to Service 106. As the Service uses a different OAuth $Client_{Svc}$ than the Backend App 116, the Backend App needs to exchange the Application Access Token $JWT_{App}$ 124 for a Service 106-specific $JWT_{Svc}$ 128 for the OAuth $Client_{Svc}$ that the Backend App 116 received from Service Instance 118. The Backend App 116 then sends its request to Service 106 along with $JWT_{Svc}$ 128 which is accepted by the Service 106 as it was created for the OAuth $Client_{Svc}$ 118 provided by the Service 106.

In some implementations, the UAA Instance 114 is associated with the App Router 112 for User 102 authentication purposes. The UAA Instance 114 can be provided by a service broker (for example, UAA Service Broker 232 in FIG. 2). In some implementations, when the User Application sends a request to the App Router 112, leveraging for example, an authentication flow (not illustrated) implemented in the App Router 112 (for example, using a markup-type computing language), an Application access Token ($JWT_{App}$ 124) is issued for an OAUTH Client (OAUTH $Client_{App}$ 122) associated with the UAA Instance 114 of the App Router 112. The $Client_{App}$ 122 is the OAUTH $Client_{App}$ mentioned in the UAA Instance 114. Similarly, the $Client_{Svc}$ 126 is the OAUTH $Client_{Svc}$ mentioned in the Service Instance 118. In general, Service instances are entities that carry some information, an OAUTH client is one of them. For the scope of this disclosure, there can be considered a 1:1 relationship between a Service instance and an OAUTH client as each Service instance is assigned their own OAUTH client. Accordingly, $JWT_{App}$ 124 is particular to the User Application. In some implementations, $JWT_{App}$ 124 can be particular to the User. For example, $JWT_{App}$ 124 can be issued when $Client_{App}$ 122 is accompanied with an identification of the User 102. In some implementations, scopes of $JWT_{App}$ 124 (for example, which Services are associated with the User Application and to which Services the User 102 has access) is limited to the scope of $Client_{App}$ 122.

As previously described, when the User 102 indirectly requests a Service 106 using the User Application, the request is received by the App Router 112. In some implementations, the User Application can be authorized to act on behalf of User 102 as part of an initial authentication process (for example, when the User 102 submits a request in the User Application, or when the User 102 is authenticated and the Application access Token $JWT_{App}$ 124 for the User Application is obtained), to access the Service 106.

In some implementations, the User Application forwards the authorization for User 102 to an OAUTH Client associated with Service 106 (for example, OAUTH $Client_{Svc}$ using a CLOUD-FOUNDRY-specific User Token grant type). In some implementations, the User Application forwards all or some of the authorities of the User Application's OAUTH client (for example, $Client_{App}$ 122) to the OAUTH $Client_{svc}$ without User interaction.

In some implementations, the User Application can request a refresh Token (not illustrated) for the User 102 and the OAUTH $Client_{svc}$ associated with the Service Instance 118. Note that a refresh token can be obtained without the client secret of the OAUTH $Client_{svc}$. However, in this case, the owner of the client secret will need to obtain a final access token from the refresh token and the client secret (a two-step process). The described technique can enhance operation by providing the client secret to the User Application so the User Application can obtain the access token directly and skip the conventional refresh token step. In some implementations, the UAA 104 issues a refresh Token for the User 102 and the OAUTH $Client_{svc}$. Note that only UAA 104 is an active component (a service). Instances (such as, 114 and 118) are just identifiers to be used by other active components. The User Application can then pass the refresh Token to the Service 106. The Service 106 can pass the refresh Token and its own client secret of its own OAUTH $Client_{Svc}$ to the UAA 104. In response, the Service 106 receives an access Token for the User 102 and the OAUTH $Client_{svc}$.

In some other implementations, the User Application requests a Service access Token ($JWT_{Svc}$ 128) for the OAUTH $Client_{svc}$, using its current Application access Token ($JWT_{App}$ 124), the client name, and the client secret of the OAUTH $Client_{svc}$. Note that when OAUTH Clients contained in Service instances are discussed, this means the OAUTH client (including both a public part and the client secret). For the purposes of this disclosure, the client secret is included in contrast an alternative flow with a refresh token where there is no client secret included in the request for the refresh token. The User Application then receives $JWT_{Svc}$ 128 for the Service 106. In some implementations, the User Application can submit a request to the Service 106 and include $JWT_{Svc}$ 128 in the request. The Service 106 uses $JWT_{Svc}$ 128 to process the request and return a response.

In yet some other implementations, and as depicted in FIG. 1, the User Application requests a Service access Token ($JWT_{Svc}$ 128) for the OAUTH Client ($Client_{svc}$ 126), using its Application access Token ($JWT_{App}$ 124). In some implementations, Backend App 116 can use Service Instance 118 to obtain $Client_{Svc}$ 126. In some implementations, the Backend App 116 contacts an authorization entity (UAA 104) to obtain Service access Token $JWT_{Svc}$ 128. In some implementations, the Backend App 116 can add additional restrictions or information to its Application access Token $JWT_{App}$ 124 for requesting the Service access Token $JWT_{Svc}$ 128. For example, these restrictions can be related to a user computing device on which the User Application is being accessed/executed or the network 130 to which the user computing device is connected. In some implementations, scopes of $JWT_{Svc}$ 128 are limited to the scopes of $Client_{Svc}$ 126. In some implementations, some of the scopes of $JWT_{Svc}$ 128 can differ from the scopes of $JWT_{Svc}$ 124.

In some implementations, the $Client_{Svc}$ 126, provided by the Service Instance 118, is a copy of OAUTH $Client_{svc}$ (Master OAUTH Client) of Service 106. In some implementations, the Service Instance 118 includes a clone of the Master OAUTH Client and the $Client_{Svc}$ 126 is a copy of the clone. In some implementations, a copy is specific to a Tenant of the User 102 requesting the Service 106. Note that JTSs are user-specific, but not OAUTH clients. OAUTH clients, however, can be tenant-specific (which is the case for copies of clones). In some implementation, a clone is specific to the Application corresponding to the Service Instance 118. In some implementations, the Service Instance 118 is provided by Service Broker 108 associated with the Service 106.

Figure 2:
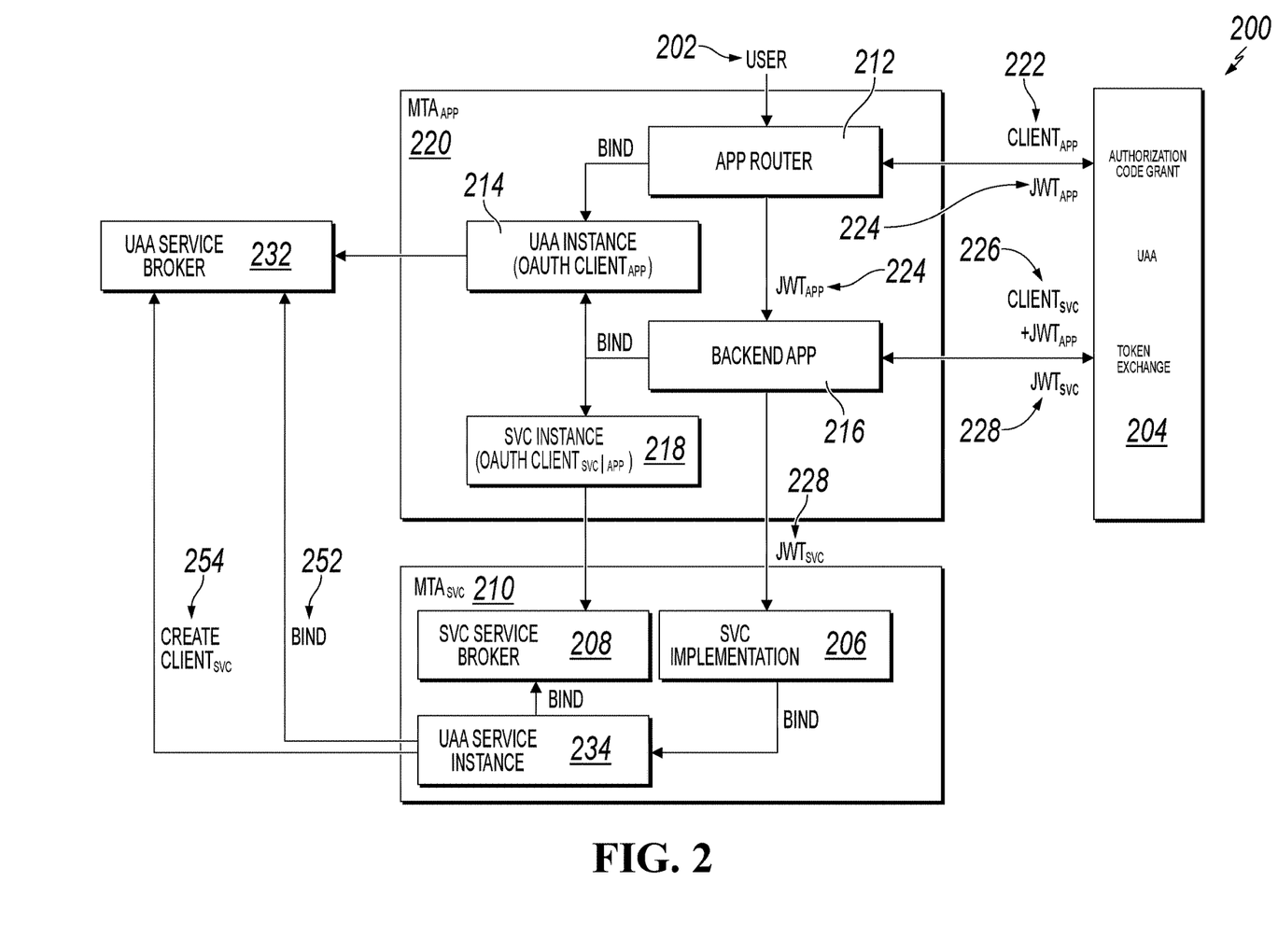
FIG. 2 is a block diagram illustrating lower-level component/data relationships in a computing system for secure identity propagation between Applications and Services, according to an implementation of the present disclosure.

FIG. 2 is a block diagram illustrating lower-level component/data relationships in a computing system 200 for secure identity propagation between Applications and Services, according to an implementation of the present disclosure. As illustrated, system 200 includes a Multi-Tenant Application (MTA) ($MTA_{APP}$ 220), a MTA configuration associated with a Service ($MTA_{Svc}$ 210), a UAA 204, and a UAA Service Broker 232. In some implementations, the $MT_{App}$ 220 and $MTA_{Svc}$ 210 can be implemented in a cloud-computing environment, for example, in CLOUD FOUNDRY.

A User (for example, User 202) can request a Service (Svc Implementation 206) through $MTA_{APP}$ 220 (for example, using an Application Router (App Router 212) receive requests from the User 202). The Svc Implementation 206 is part of a multi-Tenant Service configuration $MTA_{Svc}$ 210. The $MTA_{APP}$ 220 can perform similarly to system 100 in receiving, based on an Application access Token ($JWT_{APP}$ 224) issued for an OAUTH Client (OAUTH $Client_{App}$ 222) associated with the UAA Instance 214 of the App Router 212, a Service access Token ($JWT_{Svc}$ 228) for an OAUTH Client ($Client_{Svc}$ 226), and to access Svc Implementation 206 on behalf of the User 202. $Client_{Svc}$ 226 can be provided $MTA_{APP}$ 220 by or based on a Service instance (Svc Instance 218) associated with the Svc Implementation 206.

In some implementations, Svc Instance 218 is provided by a Service broker of the Svc Implementation 206 (Svc Service Broker 208) in $MTA_{Svc}$ 210. The SVC Service Broker 208 provides one or more Services to one or more Applications. For example, the SVC Service Broker 208 provides SVC Implementation 206 to the $MTA_{APP}$ 220.

For each Application, the SVC Service Broker 208 can provide at least one Service instance. In some implementations, each Service instance is provided particularly for one Application. In some implementations, the SVC Service Broker 208 provides one Service instance for each Service that it provides, to the Application that requests that particular Service.

As illustrated in FIG. 2, SVC Service Broker 208 provides Svc instance 218 associated with the Service Svc 206 to the $MTA_{App}$ 220. In this example, SVC Instance 218 is particularly instantiated for the $MTA_{App}$ 220 Application. In some implementations, a Service instance is created for the first time when a User requests a Service. In some implementations, Service instances are created for each Application integrated with a Service (that is, a Tenant Application), before receiving a Service request from a User.

In some implementations, the SVC Service Broker 208 can use a UAA Instance 234 to provide the SVC Instance 218. In some implementations, the SVC Service Broker 208 internally uses a UAA Service instance (for example, UAA Service Instance 234). In some implementations, the SVC Service Broker 208 requests (that is, Bind 252) the UAA Service Instance 234 from a UAA Service Broker 232. In some implementations, the UAA Service Broker 232 provides an OAUTH Client (Master OAUTH Client) to the SVC Service Broker 208. In some implementations, the Master OAUTH Client can be included in the UAA Service Instance 234. In some implementations, UAA Service Broker 232 can model the UAA Service Instances 234 through a third entity (not illustrated, e.g. a configuration file) within $MTA_{Svc}$ 210. In some implementations, the third entity can define scopes, attributes, authorities, or role templates. In some implementations, the third entity covers security concepts for CLOUD FOUNDRY. In some implementations, the OAUTH client created by a Service broker plan is generated out of the information contained in the third entity.

In some implementations, the SVC Service Broker 208 uses the Master OAUTH Client provided by UAA Service Broker 232 to create a Clone OAUTH Client that is added to (included in) Service instance 218. In some implementations, for each Service instance (SVC Instance 218), the UAA Service Broker 232 provides a clone of the Master OAUTH Client to the Service instance 218. In some implementations, the SVC Service Broker 208 calls (that is, Create $Client_{SVC}$ 254) the UAA Service Broker 232 to clone OAUTH Client from the UAA Service Instance 234. Accordingly, the SVC Service Broker 208 sends a request to clone OAUTH Client of the SVC Implementation 206 per each consuming Application of the Svc Implementation 206. In some implementations, the Master OAUTH Client is similar to a template and a clone is a clone of this template per consuming Application. In some implementations, the Application can be a multi-Tenant Application (for example, $MTA_{App}$ 220) with multiple Users.

Figure 3:
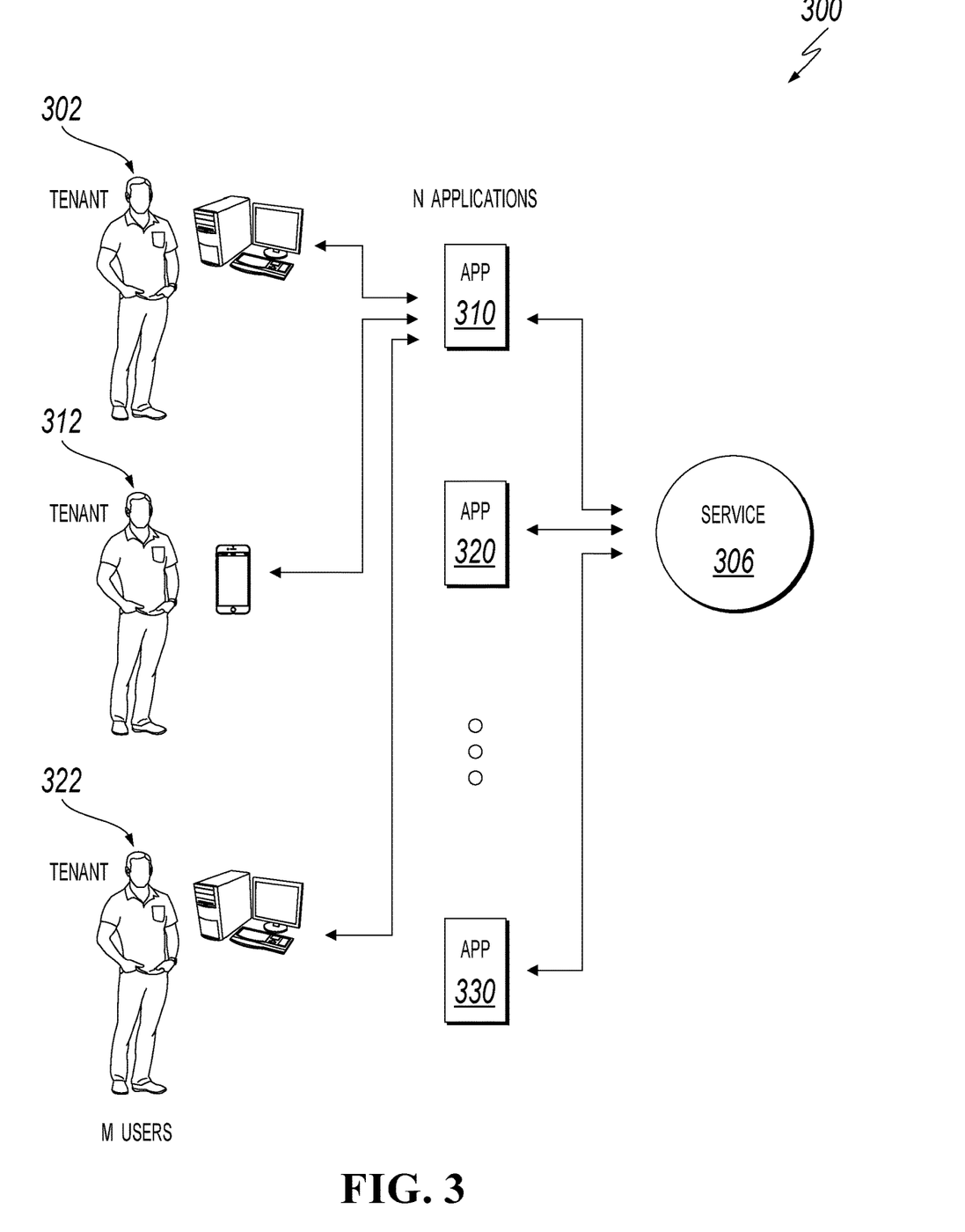
FIG. 3 is a block diagram illustrating an example configuration of a multi-tenant (or "Tenant") Service, multi-Tenant Application, according to an implementation of the present disclosure.

FIG. 3 is a block diagram illustrating an example configuration 300 of a multi-Tenant Service, multi-Tenant Application, according to an implementation of the present disclosure. As illustrated, Service 306 has n consuming Applications, that is, providing a Service to n Applications (for example, Applications 310, 320, and 330). Each Application also has multiple-Tenants. For example, Application 310 is associated with m Tenants, that is, has m Users (for example, Users 302, 312, and 322).

In some implementations with multi-Tenant Applications, a copy of a clone OAUTH $Client_{APP}$ can be provided for each Tenant requesting the Service 306. For example with respect to FIG. 2, the Backend App 216 can receive or create a copy (for example, $Client_{Svc}$ 226) of the clone associated with the Svc Instance 218 for the User 202 and use the copy to request a Service access Token ($JWT_{Svc}$ 228). There is one Master OAUTH Client for the Service. Each Application obtains an instance of the Service and with it an OAUTH client that is a clone of the Master. For each Tenant of an Application the OAUTH client (clone) of the Application is copied. There is a relationship of 1:n:m (Service:Application:Tenant).

Figure 4:
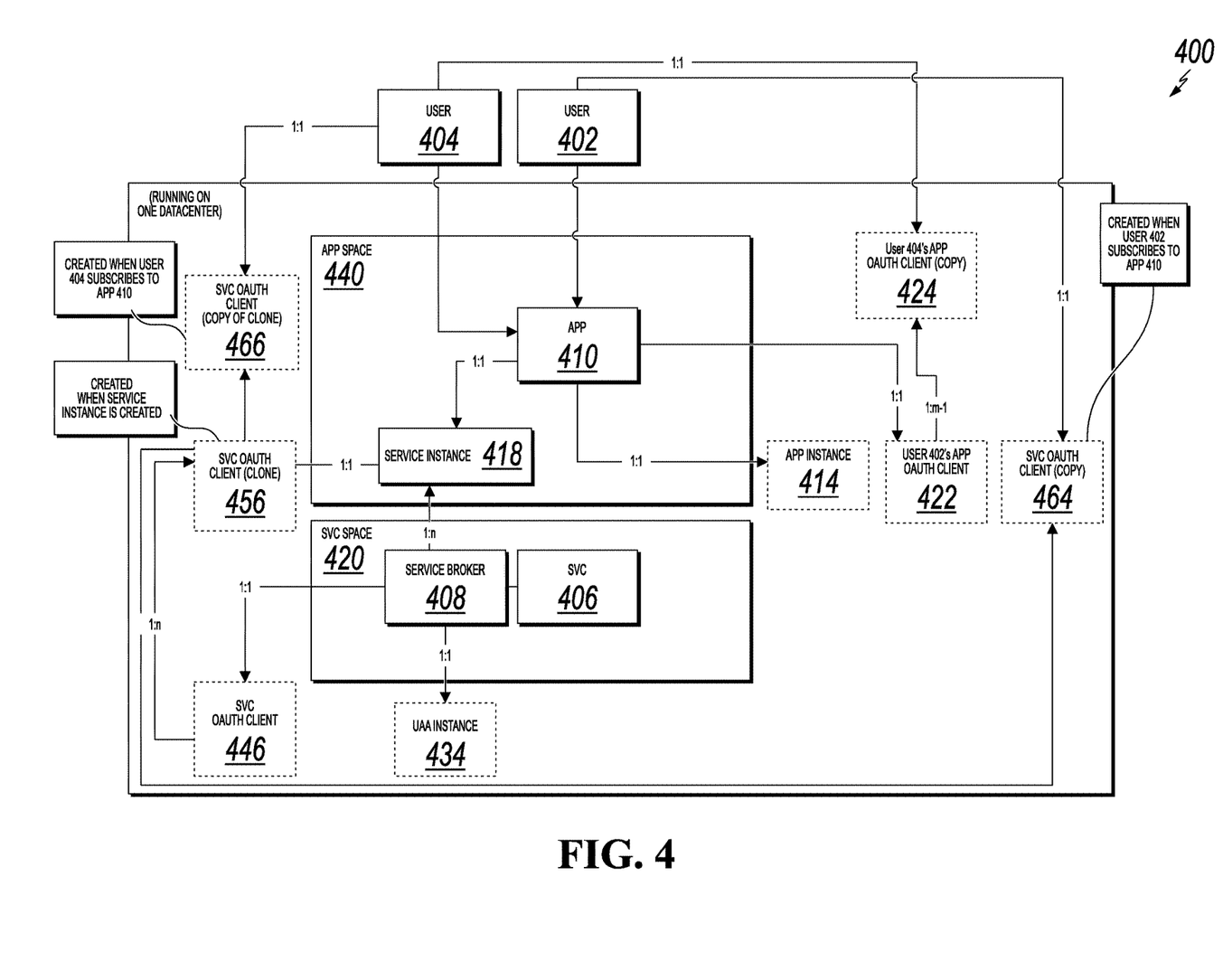
FIG. 4 is a block diagram illustrating component/data relationships for a computing system using the described Master/clone/copy Open Authentication (OAUTH) Clients, according to an implementation of the present disclosure.

FIG. 4 is a block diagram illustrating component/data relationships for a computing system 400 using the described Master/clone/copy Open Authentication (OAUTH) Clients, according to an implementation of the present disclosure. As illustrated, FIG. 4 includes a Service space 420 (for example, $MTA_{Svc}$ 210) and an Application space (App Space 440) associated with an Application (App 410) (for example, $MTA_{APP}$ 220). Users 402 and 404 are Tenants of Application 410, and Application 410 is a Tenant of Service Svc 406 with Service Broker 408.

Service Broker 408 uses a Service instance UAA Instance 434 with a Master OAUTH Client of the Service 406. Service Broker 408 creates Service Instance 418, associated with the Service 406, for the Application 410. Service Broker 408 obtains a Master OAUTH Client (SVC OAUTH Client 446) by using the UAA Instance 434. Service Broker 408 uses the SVC OAUTH Client 446 to create a clone OAUTH Client (SVC OAUTH Client (Clone) 456) for the Service Instance 418 associated with the App 410. A copy OAUTH Client (SVC OAUTH Client (Copy) 464) may be made for User 402 and a copy OAUTH Client (SVC OAUTH Client (Copy) 466) can be made for the User 404.

App 410 can perform the same communications as the User Application of FIG. 1 to authenticate the Users 402 and 404. In some implementations, the App 410 can use a UAA Instance 414 to obtain an Application OAUTH Client (for example, $Client_{App}$ 122 in FIG. 1) as an Application access Token. In some implementations, a $Client_{App}$ 422 can be created for a first User (for example, User 402) subscribing to App 410. In some implementations, a copy $Client_{App}$ 424 can be provided for a next subscription (for example, User 404 subscribing at a later time) to the App 410. In some implementations, the copy $Client_{App}$ is a copy of the $Client_{App}$.

Figure 5:
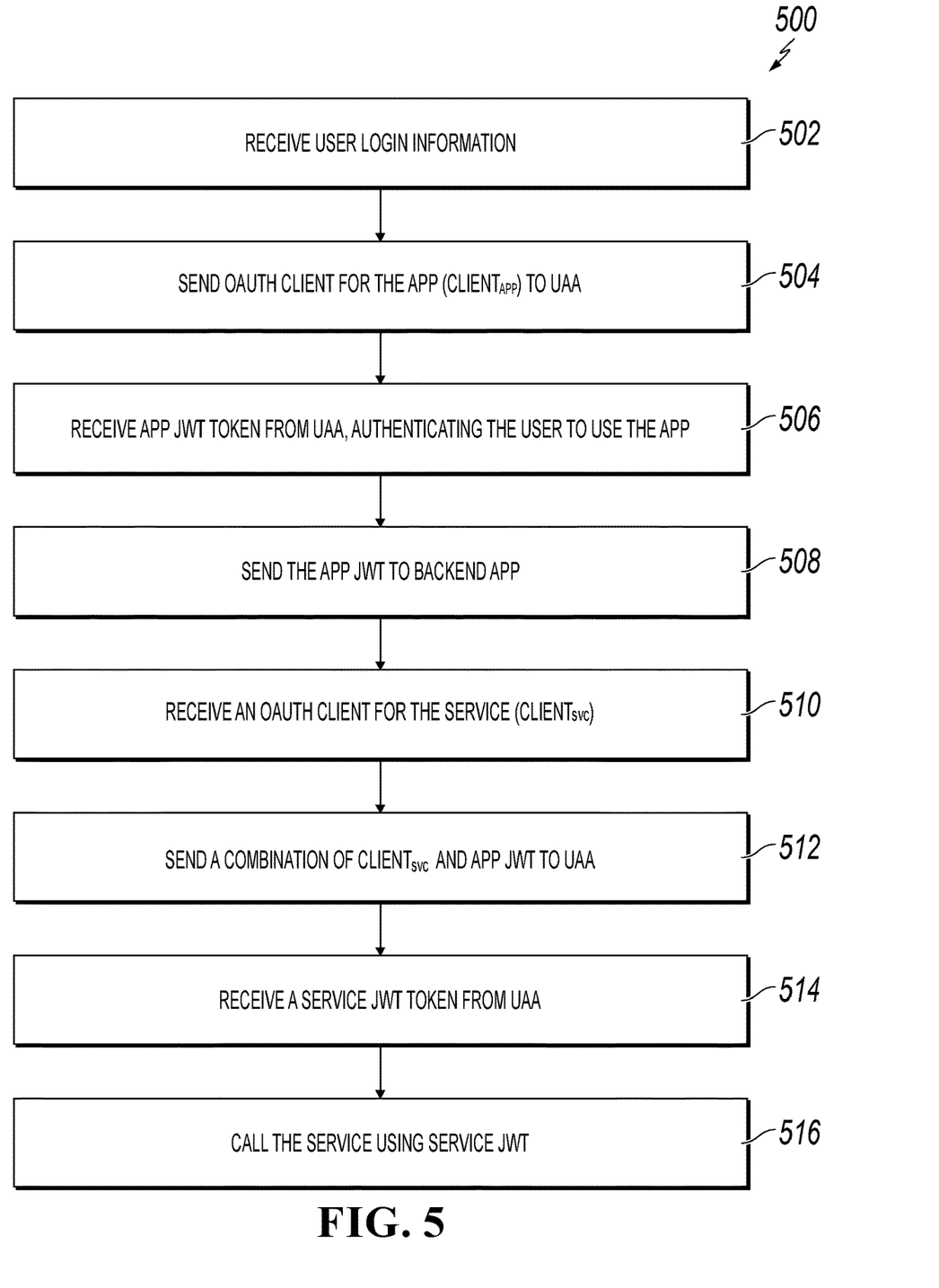
FIG. 5 is a flowchart illustrating an example method for providing a Service in a multi-Tenant computing system, according to an implementation of the present disclosure.

FIG. 5 is a flowchart illustrating an example method 500 for providing a Service in a multi-Tenant system, according to the present disclosure. For clarity of presentation, the description that follows generally describes method 500 in the context of the other figures in this description. However, it will be understood that method 500 may be performed, for example, by any suitable system, environment, software, and hardware, or a combination of systems, environments, software, and hardware, as appropriate. In some implementations, various steps of method 500 can be run in parallel, in combination, in loops, or in any order. In some implementations, all communication between elements in method 500 is encrypted (for example, using HTTPS).

At 502, User login information is received (for example, a username/password, or biometric information) for an Application. In some implementations, a request to a Service from the Application can be received along with the received login information. From 502, method 500 proceeds to 504.

At 504, an Application OAUTH Client (Client$_{App}$) (for example, the Client$_{App}$ 122 of FIG. 1) is sent to the UAA. In some implementations, the Client$_{App}$ can be obtained by using a UAA Service instance (for example, the UAA Instance 114 of FIG. 1). From 504, method 500 proceeds to 506.

At 506, an access Token (for example a JWT Token) for the Application is received from the UAA (for example, the JWT$_{App}$ 124 of FIG. 1) to be used for the User authentication and to allow the User to use the Application. From 506, method 500 proceeds to 508.

At 508, the access Token for the Application is sent to a Backend Application from an Application Router (for example, in FIG. 1, the App Router 112 can send the access token to the Backend App 116). From 508, method 500 proceeds to 510.

At 510, an OAUTH Client (Client$_{Svc}$) for the Service is received. In some implementations, the Application backend requests the Client$_{Svc}$. In some implementations, the Backend Application uses a Service Instance (for example, the Service Instance 118, 218, or 418 as in FIGS. 1, 2, and 4) to obtain the Client$_{Svc}$. In some implementations, the Client$_{Svc}$ is received from the Service Instance. From 510, method 500 proceeds to 512.

At 512, a combination of the Client$_{Svc}$ and the Application access Token is sent to a UAA (for example, the UAA 104 in FIG. 1). In some implementations, the Backend Application can send the combination the Client$_{Svc}$ and the Application access Token to the UAA. From 512, method 500 proceeds to 514.

At 514, an access Token for the Service is received from the UAA. In some implementations, the access Token is a JWT (for example, the JWT$_{Svc}$ 128 of FIG. 1). In some implementations, the Service access Token is received at the Application backend. From 514, method 500 proceeds to 516.

At 516, the Service is accessed. For example, the Service access Token can be provided to obtain access to the Service. After 516, method 500 stops.

Figure 6:
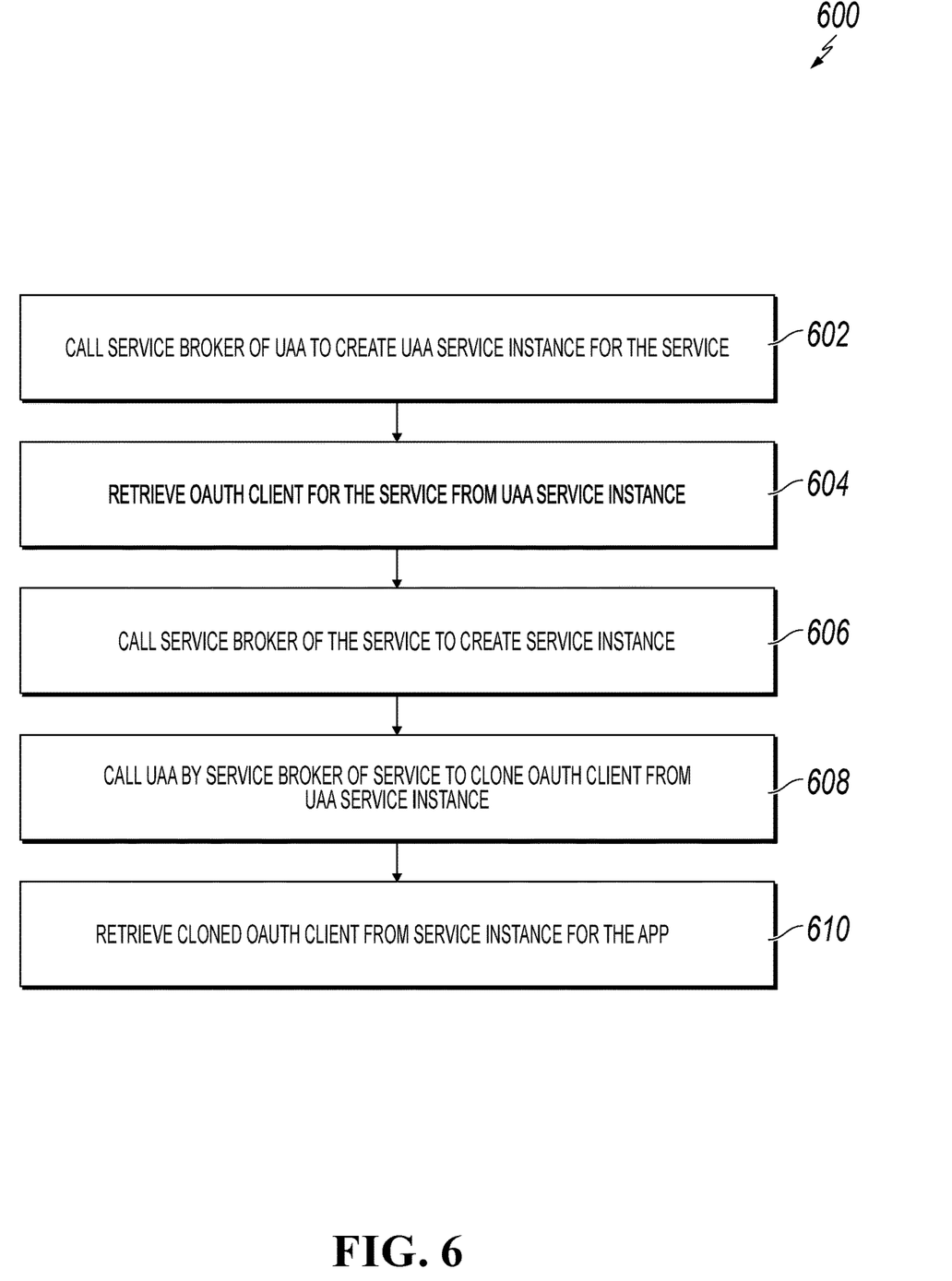
FIG. 6 is a flowchart illustrating an example method for providing a clone OAUTH Client for a Service instance in a multi-Tenant computing system, according to an implementation of the present disclosure.

FIG. 6 is a flowchart illustrating an example method 600 for providing clone OAUTH Client for a Service instance, according to the present disclosure. For clarity of presentation, the description that follows generally describes method 600 in the context of the other figures in this description. However, it will be understood that method 600 may be performed, for example, by any suitable system, environment, software, and hardware, or a combination of systems, environments, software, and hardware, as appropriate. In some implementations, various steps of method 600 can be run in parallel, in combination, in loops, or in any order. In some implementations, all communication between elements in method 600 is encrypted (for example, using HTTPS).

At 602, a UAA Service broker is called to create a UAA Service instance for a Service (for example, MTA$_{SVC}$ 210 of FIG. 2). In some implementations, a Service broker (for example, the SVC Service Broker 208 of FIG. 2) of the Service (for example, Svc 206 of FIG. 2) can call the UAA Service broker (for example, UAA Service Broker 232). In some implementations, the UAA Service instance (for example, UAA Service Instance 234) is created for internal use of the Service broker of the Service. From 602, method 600 proceeds to 604.

At 604, an OAUTH Client of the Service is retrieved from the UAA Service instance. In some implementations, the UAA Service instance has an OAUTH Client (for example, Master SVC OAUTH Client 446 of FIG. 4). In some implementations, the Service broker (for example, Service Broker 208 or 408 of FIG. 2 or 4) of the Service retrieves the Master OAUTH Client. From 604, method 600 proceeds to 606.

At 606, the Service broker of the Service is called to create a Service instance. The Service instance is, for example, created for a particular Application. In some implementations, the Service instance (for example, Service Instance 118, 218, or 418) is created by a call from the Application. In some implementations, the Service broker (for example, Service broker 108 or 208 of FIG. 1 or 2) creates a Service instance for every Application that is integrated with the Service. From 606, method 600 proceeds to 608.

At 608, the UAA is called to clone the OAUTH Client of the Service from the UAA Service instance (for example, Service broker 208 can call UAA Service Broker 232 to clone the Master OAUTH Client that is in the UAA Service Instance 234 as in FIG. 2). From 608, method 600 proceeds to 610.

At 610, the cloned OAUTH Client is retrieved from the Service instance of the Service for the Application. In some implementations, the Backend Application (for example, Backend App 216 of FIG. 2) may retrieve the cloned OAUTH Client from the Service instance of the Service (for example, the Svc Instance 218 of FIG. 2). In some multi-Tenant Applications, a copy (for example, Client$_{Svc}$) of the clone can be created for each User requesting the Service. In some implementations, the copy can be created at the Application (for example, at the Backend App 216 of FIG. 2). The copy can be sent to the UAA to obtain an access Token to the Service. After 610, method 600 stops.

Figure 7:
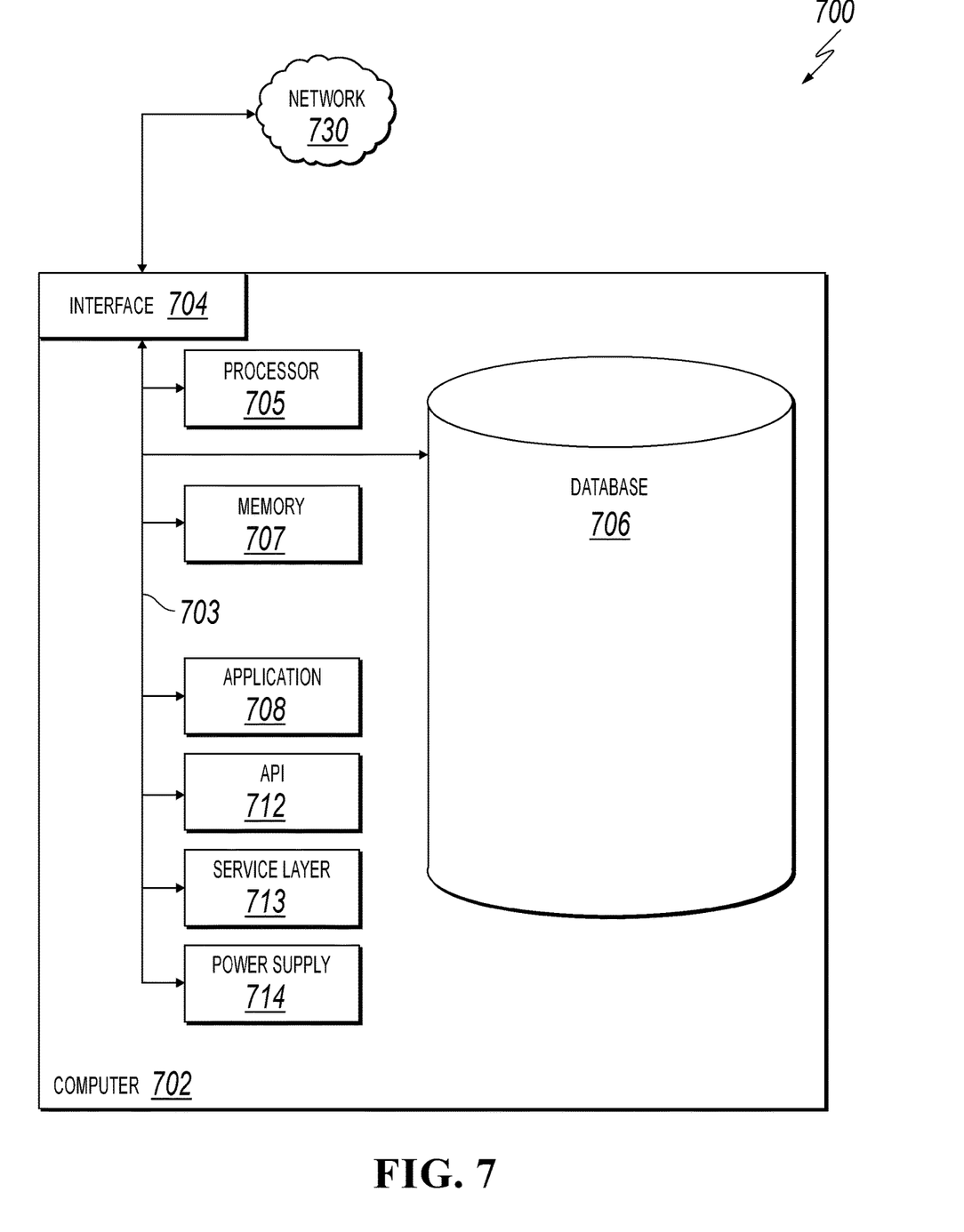
FIG. 7 is a block diagram illustrating an example of a computer-implemented system used to provide computational functionalities associated with described algorithms, methods, functions, processes, flows, and procedures, according to an implementation of the present disclosure.

FIG. 7 is a block diagram illustrating an example of a computer-implemented System 700 used to provide computational functionalities associated with described algorithms, methods, functions, processes, flows, and procedures, according to an implementation of the present disclosure. In the illustrated implementation, System 700 includes a Computer 702 and a Network 730.

The illustrated Computer 702 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 702 can include an input device, such as a keypad, keyboard, touch screen, another input device, or a combination of input devices that can accept user information, and an output device that conveys information associated with the operation of the Computer 702, including digital data, visual, audio, another type of information, or a combination of types of information, on a graphical-type user interface (UI) (or GUI) or other UI.

The Computer 702 can serve in a role in a distributed computing system as a client, network component, a server, a database or another persistency, another role, or a combination of roles for performing the subject matter described in the present disclosure. The illustrated Computer 702 is communicably coupled with a Network 730. In some implementations, one or more components of the Computer 702 can be configured to operate within an environment, including cloud-computing-based, local, global, another environment, or a combination of environments.

At a high level, the Computer 702 is an electronic computing device operable to receive, transmit, process, store, or manage data and information associated with the described subject matter. According to some implementations, the Computer 702 can also include or be communicably coupled with a server, including an application server, e-mail server, web server, caching server, streaming data server, another server, or a combination of servers.

The Computer 702 can receive requests over Network 730 (for example, from a client software application executing on another Computer 702) and respond to the received requests by processing the received requests using a software application or a combination of software applications. In addition, requests can also be sent to the Computer 702 from internal users (for example, from a command console or by another internal access method), external or third-parties, or other entities, individuals, systems, or computers.

Each of the components of the Computer 702 can communicate using a System Bus 703. In some implementations, any or all of the components of the Computer 702, including hardware, software, or a combination of hardware and software, can interface over the System Bus 703 using an application programming interface (API) 712, a Service Layer 713, or a combination of the API 712 and Service Layer 713. The API 712 can include specifications for routines, data structures, and object classes. The API 712 can be either computer-language independent or dependent and refer to a complete interface, a single function, or even a set of APIs. The Service Layer 713 provides software services to the Computer 702 or other components (whether illustrated or not) that are communicably coupled to the Computer 702. The functionality of the Computer 702 can be accessible for all service consumers using the Service Layer 713. Software services, such as those provided by the Service Layer 713, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 702, alternative implementations can illustrate the API 712 or the Service Layer 713 as stand-alone components in relation to other components of the Computer 702 or other components (whether illustrated or not) that are communicably coupled to the Computer 702. Moreover, any or all parts of the API 712 or the Service Layer 713 can be implemented as a child or a sub-module of another software module, enterprise application, or hardware module without departing from the scope of the present disclosure.

The Computer 702 includes an Interface 704. Although illustrated as a single Interface 704, two or more Interfaces 704 can be used according to particular needs, desires, or particular implementations of the Computer 702. The Interface 704 is used by the Computer 702 for communicating with another computing system (whether illustrated or not) that is communicatively linked to the Network 730 in a distributed environment. Generally, the Interface 704 is operable to communicate with the Network 730 and includes logic encoded in software, hardware, or a combination of software and hardware. More specifically, the Interface 704 can include software supporting one or more communication protocols associated with communications such that the Network 730 or hardware of Interface 704 is operable to communicate physical signals within and outside of the illustrated Computer 702.

The Computer 702 includes a Processor 705. Although illustrated as a single Processor 705, two or more Processors 705 can be used according to particular needs, desires, or particular implementations of the Computer 702. Generally, the Processor 705 executes instructions and manipulates data to perform the operations of the Computer 702 and any algorithms, methods, functions, processes, flows, and procedures as described in the present disclosure.

The Computer 702 also includes a Database 706 that can hold data for the Computer 702, another component communicatively linked to the Network 730 (whether illustrated or not), or a combination of the Computer 702 and another component. For example, Database 706 can be an in-memory, conventional, or another type of database storing data consistent with the present disclosure. In some implementations, Database 706 can be a combination of two or more different database types (for example, a hybrid in-memory and conventional database) according to particular needs, desires, or particular implementations of the Computer 702 and the described functionality. Although illustrated as a single Database 706, two or more databases of similar or differing types can be used according to particular needs, desires, or particular implementations of the Computer 702 and the described functionality. While Database 706 is illustrated as an integral component of the Computer 702, in alternative implementations, Database 706 can be external to the Computer 702.

The Computer 702 also includes a Memory 707 that can hold data for the Computer 702, another component or components communicatively linked to the Network 730 (whether illustrated or not), or a combination of the Computer 702 and another component. Memory 707 can store any data consistent with the present disclosure. In some implementations, Memory 707 can be a combination of two or more different types of memory (for example, a combination of semiconductor and magnetic storage) according to particular needs, desires, or particular implementations of the Computer 702 and the described functionality. Although illustrated as a single Memory 707, two or more Memories 707 or similar or differing types can be used according to particular needs, desires, or particular implementations of the Computer 702 and the described functionality. While Memory 707 is illustrated as an integral component of the Computer 702, in alternative implementations, Memory 707 can be external to the Computer 702.

The Application 708 is an algorithmic software engine providing functionality according to particular needs, desires, or particular implementations of the Computer 702, particularly with respect to functionality described in the present disclosure. For example, Application 708 can serve as one or more components, modules, or applications. Further, although illustrated as a single Application 708, the Application 708 can be implemented as multiple Applications 708 on the Computer 702. In addition, although illustrated as integral to the Computer 702, in alternative implementations, the Application 708 can be external to the Computer 702.

The Computer 702 can also include a Power Supply 714. The Power Supply 714 can include a rechargeable or non-rechargeable battery that can be configured to be either user- or non-user-replaceable. In some implementations, the Power Supply 714 can include power-conversion or management circuits (including recharging, standby, or another power management functionality). In some implementations, the Power Supply 714 can include a power plug to allow the Computer 702 to be plugged into a wall socket or another power source to, for example, power the Computer 702 or recharge a rechargeable battery.

There can be any number of Computers 702 associated with, or external to, a computer system containing Computer 702, each Computer 702 communicating over Network 730. Further, the term "client," "user," or other appropriate terminology can be used interchangeably, as appropriate, without departing from the scope of the present disclosure. Moreover, the present disclosure contemplates that many users can use one Computer 702, or that one user can use multiple computers 702.

Described implementations of the subject matter can include one or more features, alone or in combination.

For example, in a first implementation, a computer-implemented method, comprising: receiving, by one or more processors, at a computer Application, a request for a Service from a User; requesting, by the one or more processors, an Open Authorization (OAUTH) Client of the Service from a Service Instance of the Service; providing, by the one or more processors, a copy OAUTH Client of the Service based on a clone OAUTH Client associated with the Service Instance, the copy OAUTH Client being specific to the User; obtaining, by the one or more processors, a Token to access the Service by providing the copy OAUTH Client to a User Account and Authorization (UAA) entity; and obtaining, by the one or more processors, access to the Service by providing the Token.

The foregoing and other described implementations can each, optionally, include one or more of the following features:

A first feature, combinable with any of the following features, wherein the Service Instance is provided by a Service Broker of the Service associated with a Master OAUTH Client of the Service.

A second feature, combinable with any of the previous or following features, wherein the clone OAUTH Client is provided based on the Master OAUTH Client and is specific to the Service Instance.

A third feature, combinable with any of the previous or following features, wherein the clone OAUTH Client is provided according to a UAA Service Instance.

A fourth feature, combinable with any of the previous or following features, wherein the UAA Service Instance is used specifically by a Service Broker that provides the Service Instance of the Service.

A fifth feature, combinable with any of the previous or following features, wherein the clone OAUTH Client is specific to the Application.

A sixth feature, combinable with any of the previous or following features, wherein the Service Instance is specific to the Application.

In a second implementation, a non-transitory, computer-readable medium storing one or more instructions executable by a computer system to perform operations comprising: receiving, at a computer Application, a request for a Service from a User; requesting an Open Authorization (OAUTH) Client of the Service from a Service Instance of the Service; providing a copy OAUTH Client of the Service based on a clone OAUTH Client associated with the Service Instance, the copy OAUTH Client being specific to the User; obtaining a Token to access the Service by providing the copy OAUTH Client to a User Account and Authorization (UAA) entity; and obtaining, access to the Service by providing the Token.

The foregoing and other described implementations can each, optionally, include one or more of the following features:

A first feature, combinable with any of the following features, wherein the Service Instance is provided by a Service Broker of the Service associated with a Master OAUTH Client of the Service.

A second feature, combinable with any of the previous or following features, wherein the clone OAUTH Client is provided based on the Master OAUTH Client and is specific to the Service Instance.

A third feature, combinable with any of the previous or following features, wherein the clone OAUTH Client is provided according to a UAA Service Instance.

A fourth feature, combinable with any of the previous or following features, wherein the UAA Service Instance is used specifically by a Service Broker that provides the Service Instance of the Service.

A fifth feature, combinable with any of the previous or following features, wherein the clone OAUTH Client is specific to the Application.

A sixth feature, combinable with any of the previous or following features, wherein the Service Instance is specific to the Application.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: receiving, at a computer Application, a request for a Service from a User; requesting an Open Authorization (OAUTH) Client of the Service from a Service Instance of the Service; providing a copy OAUTH Client of the service based on a clone OAUTH Client associated with the Service Instance, the copy OAUTH Client being specific to the User; obtaining a Token to access the Service by providing the copy OAUTH Client to a User Account and Authorization (UAA) entity; and obtaining, access to the Service by providing the Token.

The foregoing and other described implementations can each, optionally, include one or more of the following features:

A first feature, combinable with any of the following features, wherein the Service Instance is provided by a Service Broker of the Service associated with a Master OAUTH Client of the Service.

A second feature, combinable with any of the previous or following features, wherein the clone OAUTH Client is provided based on the Master OAUTH Client and is specific to the Service Instance.

A third feature, combinable with any of the previous or following features, wherein the clone OAUTH Client is provided according to a UAA Service Instance.

A fourth feature, combinable with any of the previous or following features, wherein the UAA Service Instance is used specifically by a Service Broker that provides the Service Instance of the Service.

A fifth feature, combinable with any of the previous or following features, wherein the clone OAUTH Client is specific to the Application.

A sixth feature, combinable with any of the previous or following features, wherein the Service Instance is specific to the Application.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure.

Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
receiving, by one or more processors, at a computer Application, a request for a Service from a User;
requesting, by the one or more processors and from a Service Instance created by a first Service Broker of the Service, a Master Open Authorization (OAUTH) Client of the Service;
receiving, by the one or more processors and from the Service Instance, a copy OAUTH Client based on a clone of the Master OAUTH Client, the clone being associated with the Service Instance, the copy OAUTH Client being specific to the User;
providing the copy OAUTH Client to a User Account and Authorization (UAA) entity to obtain a service-specific Token, wherein the UAA entity generates the Token in response to authenticating the User based on the copy OAUTH Client; and
obtaining, by the one or more processors, access to the Service by providing the service-specific Token.

2. The computer-implemented method of claim 1, wherein the clone is specific to the Service Instance.

3. The computer-implemented method of claim 1, wherein the clone is provided according to a UAA Service Instance created by a UAA service broker.

4. The computer-implemented method of claim 3, wherein the UAA Service Instance is used by the first Service Broker specifically to create the clone for the Service Instance of the Service.

5. The computer-implemented method of claim 1, wherein the clone is specific to the Application.

6. The computer-implemented method of claim 1, wherein the Service Instance is created specifically for the Application.

7. A non-transitory, computer-readable medium storing one or more instructions executable by a computer system to perform operations comprising:
receiving, at a computer Application, a request for a Service from a User;
requesting from a Service Instance created by a first Service Broker of the Service, a Master Open Authorization (OAUTH) Client of the Service;
receiving from the Service Instance, a copy OAUTH Client based on a clone of the Master OAUTH Client, the clone being associated with the Service Instance, the copy OAUTH Client being specific to the User;
providing the copy OAUTH Client to a User Account and Authorization (UAA) entity to obtain a service-specific Token, wherein the UAA entity generates the Token in response to authenticating the User based on the copy OAUTH Client; and
obtaining, access to the Service by providing the service-specific Token.

8. The non-transitory, computer readable medium of claim 7, wherein the clone is specific to the Service Instance.

9. The non-transitory, computer readable medium of claim 7, wherein the clone is provided according to a UAA Service Instance created by a UAA service broker.

10. The non-transitory, computer readable medium of claim 9, wherein the UAA Service Instance is used by the first Service Broker specifically to create the clone for the Service Instance of the Service.

11. The non-transitory, computer readable medium of claim 7, wherein the clone is specific to the Application.

12. The non-transitory, computer readable medium of claim 7, wherein the Service Instance is created specifically for the Application.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, at a computer Application, a request for a Service from a User;
requesting from a Service Instance created by a first Service Broker of the Service, a Master Open Authorization (OAUTH) Client of the Service;
receiving from the Service Instance, a copy OAUTH Client based on a clone of the Master OAUTH Client, the clone being associated with the Service Instance, the copy OAUTH Client being specific to the User;
providing the copy OAUTH Client to a User Account and Authorization (UAA) entity to obtain a service-specific Token, wherein the UAA entity generates the Token in response to authenticating the User based on the copy OAUTH Client; and
obtaining, access to the Service by providing the service-specific Token.

14. The computer-implemented system of claim 13, wherein the clone is specific to the Service Instance.

15. The computer-implemented system of claim 13, wherein the clone is provided according to a UAA Service Instance created by a UAA service broker.

16. The computer-implemented system of claim 15, wherein the UAA Service Instance is used by the first Service Broker specifically to create the clone for the Service Instance of the Service.

17. The computer-implemented system of claim 13, wherein:
the clone is specific to the Application; and
the Service Instance is created specifically for the Application.

* * * * *